United States Patent [19]
Rossi

[11] Patent Number: 4,465,709
[45] Date of Patent: Aug. 14, 1984

[54] METHOD OF PROCESSING TIRE CORD FABRIC

[75] Inventor: Robert K. Rossi, Akron, Ohio

[73] Assignee: The Goodyear Tire & Rubber Company, Akron, Ohio

[21] Appl. No.: 389,681

[22] Filed: Jun. 18, 1982

[51] Int. Cl.³ .............................................. B05D 1/02
[52] U.S. Cl. .................................... 427/209; 152/358; 427/243; 427/389.9; 427/421
[58] Field of Search ................ 152/358; 427/209, 243, 427/389.9, 176, 421; 118/316

[56] References Cited
U.S. PATENT DOCUMENTS

| Re. 21,269 | 11/1939 | Copeman | 428/254 |
|---|---|---|---|
| 1,277,986 | 9/1918 | Merrill | 118/316 X |
| 2,771,659 | 11/1956 | Ball | 427/389.9 X |
| 3,032,441 | 5/1962 | Beaumont et al. | 427/176 X |
| 3,962,511 | 6/1976 | Foti | 428/246 |
| 4,044,811 | 9/1977 | Dudek | 152/354 |
| 4,201,744 | 5/1980 | Makinson | 264/250 |
| 4,261,393 | 4/1981 | Saito et al. | 152/358 X |

Primary Examiner—Evan K. Lawrence
Attorney, Agent, or Firm—Frederick K. Lacher; H. C. Young, Jr.

[57] ABSTRACT

Tire cord fabric is processed by supporting a section of fabric and adjusting the warp cords to hang so that they are evenly distributed in a longitudinal direction. The fabric is then clamped in place and a dilute reactive polyurethane solution is sprayed to wet the cords on both sides of the fabric so that the coating on the cords is extremely thin and acts as a sizing material for the fabric to give it dimensional stability and preserve the interstices of the cords. The fabric is then heated to evaporate the solvent and cause the polyurethane mixture to be at least partially cured and to at least partially cover the cords of the fabric. The treated fabric may be used to reinforce a cast polyurethane tire.

9 Claims, 7 Drawing Figures

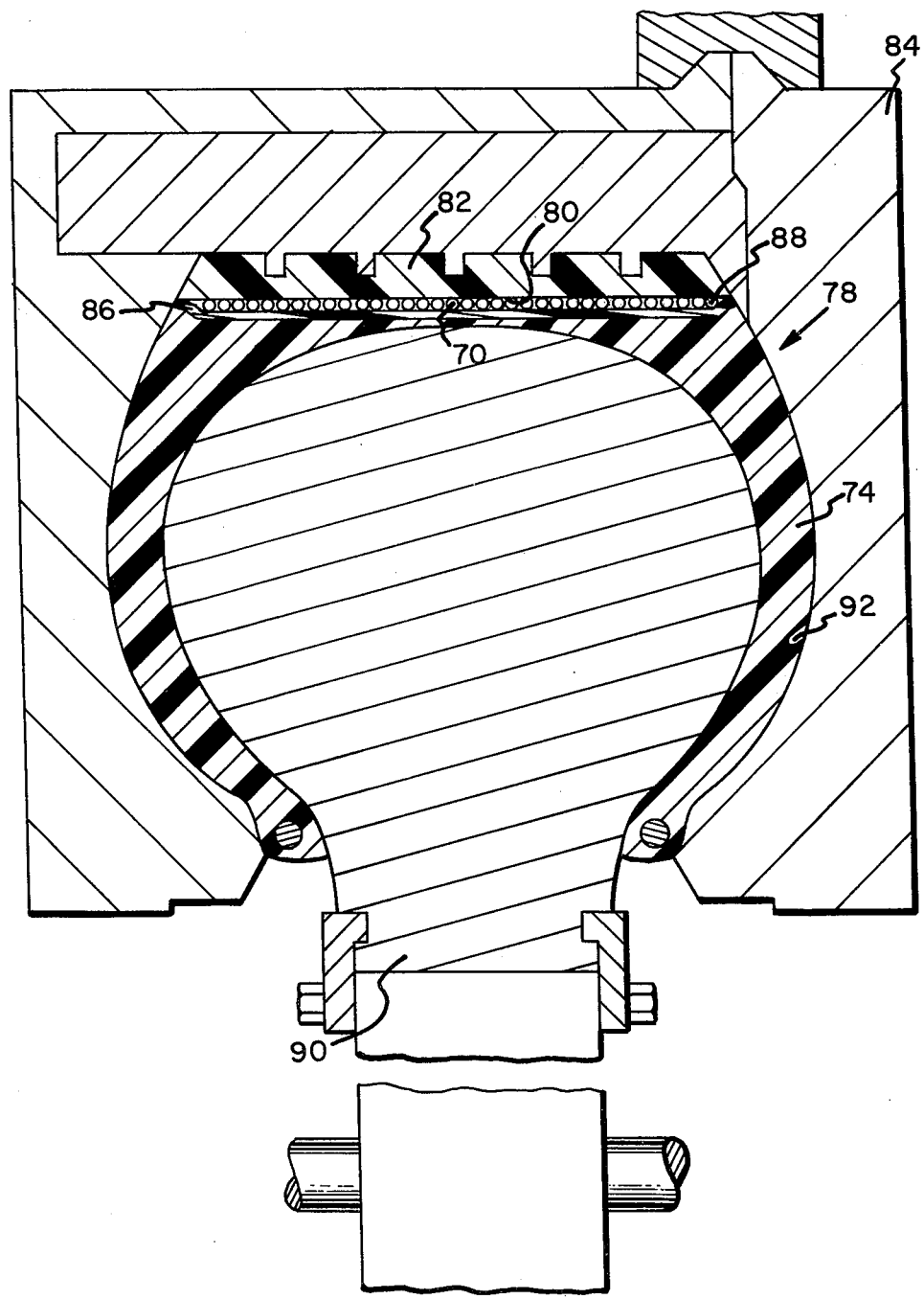
F I G. 7

METHOD OF PROCESSING TIRE CORD FABRIC

This invention relates to the processing of cord fabric and especially to the processing of tire fabric to obtain dimensional stability so that the fabric can be cut to size and used as a cord belt in a tire which is formed by a suitable casting operation such as spin casting. In one application the cut and treated fabric is placed on the inside of a precast polyurethane tread and held in place in the mold while the remainder of the tire is poured or spin cast.

It has been found that in order to properly adhere the tire fabric to the precast polyurethane tread and to have the fabric stay in position during the spin casting operation, the fabric must have a degree of dimensional stability. It has also been observed that a tire fabric made of nylon, polyester, or flexten treated with resorcinol formaldehyde latex typically does not have the necessary properties to provide a satisfactory chemical or mechanical bond to the polyurethane body of the tire.

With the method of this invention a tire fabric is given dimensional stability by applying a thin coating to the cords and thereby facilitating handling and resisting distortion during the casting process. The thin coating of the cords permits later penetration of the tire body material (polyurethane) into spaces between the cords and into the interstices of the cords to provide a mechanical bond. There is also apparently a chemical reaction between the polyurethane coating material and the polyurethane body material of the tire providing a chemical bond. The result has been observed to be a satisfactory adhesion of the fabric to the body material of the tire due to the mechanical and chemical bonds.

In accordance with the invention there is provided a method of processing tire cord fabric comprising (a) supporting a section of said tire fabric; (b) adjusting the support of the cords of said fabric so that the cords are evenly distributed in a longitudinal direction; (c) coating said fabric on both sides with a dilute reactive polyurethane solution to provide a coated fabric; (d) heating said coated fabric at a predetermined temperature for a predetermined time to evaporate the solvent and cause the polyurethane mixture to be at least partially cured and to at least partially cover the cords of the fabric; and (e) cooling said coated fabric.

It is most important that the resultant polyurethane coating of the cords be extremely thin so that it acts primarily as a sizing material for the fabric to give it a dimensional stability and does not fully encapsulate the fabric so that the interstices of the cords are essentially preserved.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the drawings:

FIG. 7 is a schematic cross-sectional view of a mold for casting the tire of FIG. 6 by centrifugal casting showing the collapsible core assembled in position in the mold.

Figure 1:
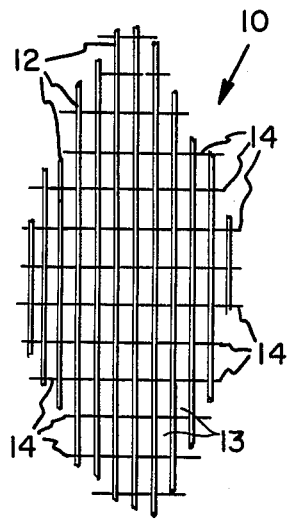
FIG. 1 is an enlarged fragmentary view of a section of the tire fabric before being treated.

Referring to FIG. 1, tire cord fabric 10 is generally loosely woven with warp cords 12 connected by pick cords 14 at spaced-apart intervals with spaces 13 between the cords. The warp cords 12 are relatively thick and made from twisted strands or filaments and of a high strength material such as nylon, polyester or flexten. The pick cords 14 are relatively thin and made from a low strength material such as cotton. The tire cord fabric 10 is woven and then wound on a supply roll 16 shown in FIGS. 2 and 3. The supply roll 16 may have a supporting shaft 18 with ends supported in bearings 20 on end supports 22 of a roll stand 24.

Figure 2:
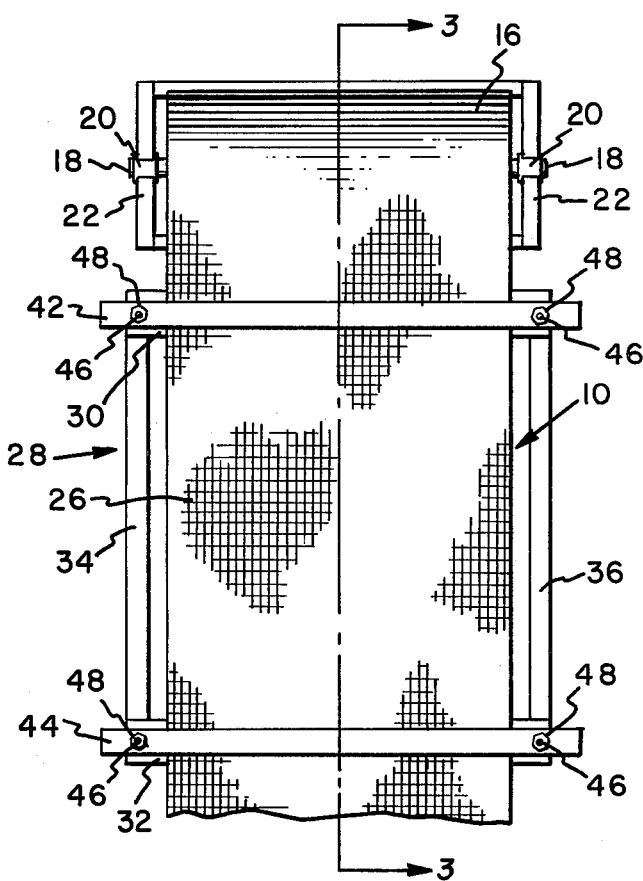
FIG. 2 is a plan view showing a supply roll of the fabric with a section clamped in a supporting frame for processing.
Figure 3:
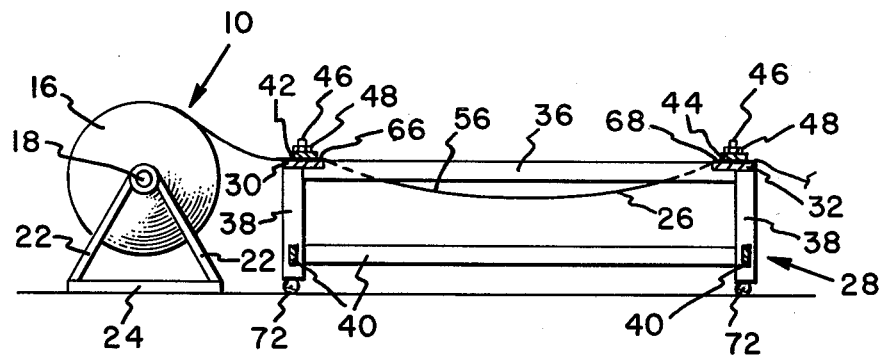
FIG. 3 is a sectional view taken along the line 3—3 of FIG. 2.

In accordance with the method of this invention, a section 26 of the tire cord fabric 10 is supported in a generally horizontal position on a frame 28 having transverse frame members 30 and 32, and spaced-apart longitudinal frame members 34 and 36 connected to the transverse frame members. The frame 28 also has supporting legs 38 which are connected by secondary frame members 40 as shown in FIGS. 2 and 3.

Two transverse clamping bars 42 and 44 are provided for clamping the ends of the section 26 of tire cord fabric 10 against the transverse frame members 30 and 32. The clamping bars 42 and 44 may be of steel and have sufficient weight to hold the fabric 10 in position during the adjusting of the section 26 so that the warp cords 12 will hang with the same deflection or drape and are distributed evenly in a longitudinal direction across the width of the fabric. Holes are provided at the ends of the clamping bars 42 and 44 for sliding movement over studs 46 fastened to the transverse frame members 30 and 32 and extending upwardly therefrom. Nuts 48 may be threaded on the studs 46 for urging the clamping bars 42 and 44 against the transverse frame members 30 and 32 and thereby holding the ends of the section 26 of tire cord fabric 10 firmly in place. It is understood that the section 26 of tire cord fabric 10 may be supported in a vertical position with the warp cords 12 being distributed evenly in a longitudinal direction.

Figure 4:
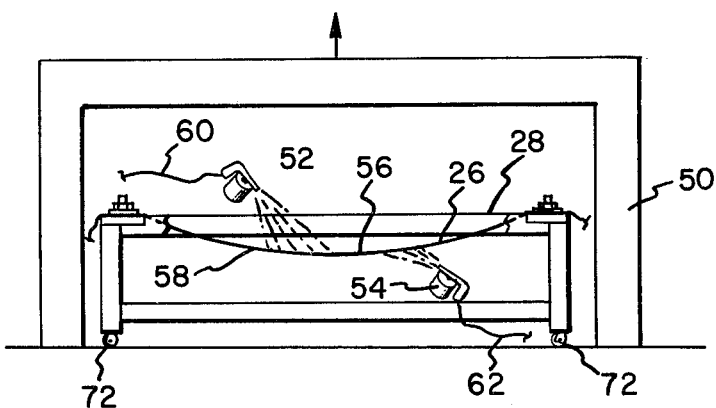
FIG. 4 is a schematic view showing the fabric being sprayed.

Referring to FIG. 4, an enclosed chamber such as a paint booth 50, which is vented for removing undesirable vapors, is shown with the frame 28 placed therein after cutting the section 26 of tire cord fabric 10 from the supply roll 16. Aspirator type spray guns 52 and 54 for spraying a top surface 56 and a bottom surface 58 of the section 26 are shown. These guns 52 and 54 are connected by hoses 60 and 62 to a suitable source of air under pressure and have containers for holding the solution to be sprayed. When the section 26 is supported in a vertical position, the solution may also be sprayed on both surfaces 56 and 58.

Figure 5:
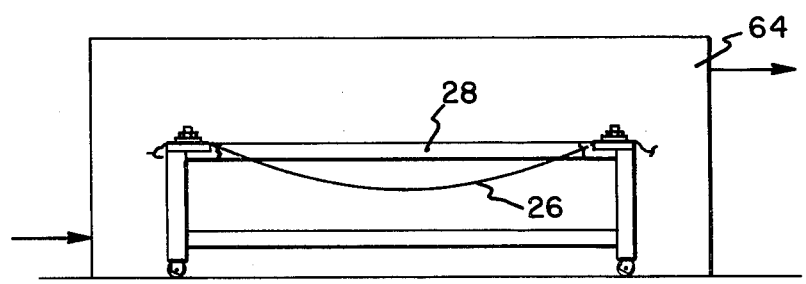
FIG. 5 is a schematic view of the oven showing the fabric being heated, with parts being broken away.

Referring to FIG. 5, an oven 64, which may be of a steam heated type, is shown with the frame 28 and clamped section 26 of fabric 10 positioned within the oven for heating at a predetermined temperature for a predetermined time to evaporate the solvent in the solution and cause the mixture therein to at least partially cover the cords 12 and 14.

In accordance with the present invention, the untreated tire cord fabric 10 is wound on a supply roll 16 and supported on a roll stand 24 as shown in FIGS. 2 and 3. A section 26 of the tire cord fabric 10 is pulled from the supply roll 16 and draped with the warp cords 12 extending in the longitudinal direction over the transverse frame members 30 and 32 of the frame 28. Preferably the width of the section 26 is less than the distance between the longitudinal frame members 34 and 36 to avoid any interference between the cord fabric 10 and frame 28.

The clamping bars 42 and 44 are laid over the top of the fabric 10 and hold the section 26 during adjustment for an even drape across the width of the section with the warp cords evenly distributed in the longitudinal direction. If desired, strips of adhesive-backed foam tape 66 and 68 may be adhered to the contacting surfaces of the clamping bars 42 and 44 with the adhesive backing exposed for engagement with the cord fabric 10 so that the weight of the bars 42 and 44 will hold the fabric while it is adjusted to hang evenly across the width thereof. After the fabric 10 has been adjusted to hang evenly, the nuts 48 are threaded on the studs 46 and clamping bars 42 and 44 pressed tightly against the transverse frame members 30 and 32.

The section 26 of the tire cord fabric 10 may then be cut from the fabric on the supply roll 16 at a position close to the transverse frame member 30 to provide a section with a length corresponding to the length of a cord belt 70.

The frame 28 may have casters 72 so that it can be rolled into the paint booth 50 for spraying the top surface 56 and bottom surface 58 of the section 26 with a dilute reactive polyurethane solution prepared from a prepolymer and curative solution which may be, if desired, of the same material as a tire body 74 on which the cord belt 70 is to be used. The reactive polyurethane solution is sprayed through the spray guns 52 and 54 by filling the air gun bottles with the solution and connecting the air hoses 60 and 62 to a suitable source of air under pressure. The solution is then applied so as to merely wet the top and bottom surfaces 56 and 58 of the section 26 of the tire cord fabric 10.

Preferably the curative solution is added to the prepolymer so that the ratio of amine groups of the curative to the free NCO groups of the prepolymer is in the range of from 0.8/1 to 1/1 with the free NCO groups being the excess of NCO groups of the polyisocyanate over the hydroxyl groups of the polymeric polyols in the prepolymer. The prepolymer is prepared separately by charging a reactor with a predetermined amount of polyol, degassing the polyol and then adding a required amount of diisocyanate to the degassed polyol at a predetermined temperature of about 212° F. (100° C.) under agitation with a full vacuum applied for a minimum period of time required to mix the diisocyanate and polyol.

The curative solution may be made by dissolving a predetermined amount of diamine curative such as Polacure solids in liquid ketone such as methylethyl ketone. For example, to 250 grams of prepolymer in a one-quart can an equal weight of 50/50 toluene/methylethyl ketone solvent mixture was added and then stirred until dissolved. The solvent mixture was prepared by dissolving Polacure (trimethyleneglycol di-para-aminobenzoate) 20% in methylethyl ketone.

Then the desired amount of curative solution was added to the prepolymer solution and thoroughly mixed. A dilute solution is preferred for spraying, although this is not critical, and may normally be twenty parts by weight of polyurethane reactive material based on one hundred parts by weight of the curative prepolymer solution. In this embodiment, this solution was sprayed on the cords 12 and 14 thinly and uniformly on both the top surface 56 and bottom surface 58 of the tire cord fabric 10 in the section 26. Preferably the weight of the coating spray is only sufficient to wet the cords and bond the warp cords to the pick cords 14. It has been found that this has been achieved with the weight of the dry coating being in a range of from about 17 to 47 percent and preferably about 17 percent of the weight of the fabric.

The frame 28 and section 26 of tire cord fabric 10 are then rolled into the steam oven 64 and heated at a suitable temperature such as 200° F. (93° C.) for a suitable period of time such as one hour to evaporate the solvent and cause the polyurethane mixture to at least partially cover the cords 12 and 14 of the fabric 10.

After being heated the frame 28 is removed from the oven 64 and the section 26 of fabric 10 cut into cord belts 70 which may be four inches wide. This may be done by cutting the pick cords 14 between the warp cords 12 with a razor blade or scissors. Preferably the fabric 10 is left supported in the frame 28 until needed.

Figure 6:
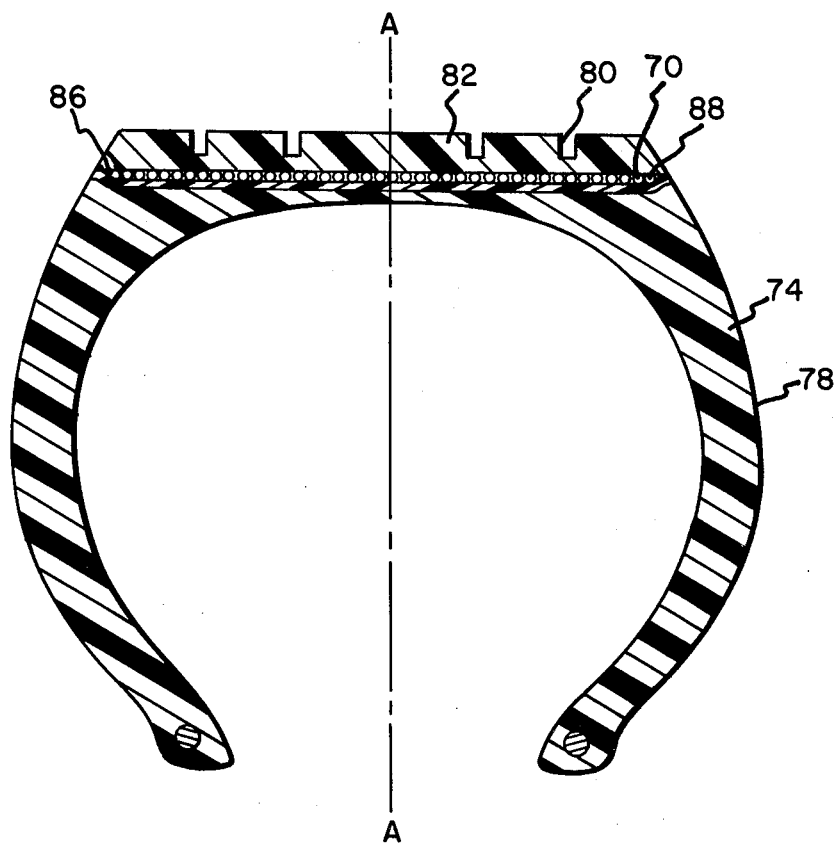
FIG. 6 is a cross-sectional view of a tire built in accordance with this invention.

The warp cords 12 and pick cords 14 are coated with a thin layer of reactive polyurethane solution leaving spaces 13 between the cords so that when this treated cord fabric 10 is later used in a tire construction such as a tire cast of polyurethane, the polyurethane material of the tire may flow into the spaces 13 and interstices of the cords to provide a mechanical bond. The mechanical bond is also improved because the low viscosity of the polyurethane solution facilitates penetration into the spaces 13 between the cords 12 and 14 and interstices of the cords of the treated tire cord fabric 10. It has been found that the tire cord fabric 10 treated in accordance with this method has good dimensional stability and can be handled easily for positioning plies of the fabric in a tire 78 such as that shown in FIGS. 6 and 7. It has also been found that the treated and cut fabric 10 in the form of the cord belt 70 can be placed on the inside surface 80 of a precast polyurethane tread 82 and held in place while the remainder of the tire 78 is poured or spin cast in a mold 84 by the steps shown and described in my copending patent application Ser. No. 344,985, filed Feb. 2, 1982. For example, with reference to FIGS. 6 and 7, the tire 78 may be made by spin casting the tread 82 in the space at the radially outer portion of the mold 84 and then reacting and partially curing the material to form the tread 82 of a suitable polyurethane composition. The cord belt 70, which is an intermediate type product for tire manufacture, is made in accordance with the process set forth hereinabove and positioned on the inside surface 80 of the tread 82 with edges 86 and 88 equidistant from a centerplane A—A of the tire 78. The cord belt 70 may be fastened to the inside surface 80 of the tread 82 by suitable fastening means. A core member 90 may be inserted in the mold 84, and the tire body 74 or casing formed by introducing and rotationally casting a predetermined quantity of liquid reaction mixture of elastomer forming material in a space 92 between the core, the mold and the tread 82. The elastomer forming material is reacted and at least partially cured to form the tire body 74 of a suitable polyurethane composition overlapping and integrally adhered to the reinforcing cord belt 70 and the tread 82. The tire 78 and core 90 may then be removed from the mold 84 and the core removed from the tire.

Each of the cord belts 70 may also be made of two or more layers of treated fabric 10. When it is desirable, the layers may be cut on a bias with the warp cords 12 at an angle greater than zero degrees to the edges of one of the belts so that when the tire 78 is inflated the cords may pantograph and provide limited stretching of the belt.

While a certain representative embodiment and details have been described and shown for the purpose of illustrating the invention, it will be apparent to those skilled in the art that various changes and modifications may be made therein without departing from the spirit or scope of the invention.

What is claimed is:

1. A method of processing tire cord fabric for reinforcing a tire of cast polyurethane with said fabric having loosely woven warp cords made from twisted strands of a high strength material and relatively thin pick cords of a low strength material, said warp cords having interstices and being connected by said pick cords at spaced-apart intervals defining spaces in said fabric between said warp cords and said pick cords comprising:

(a) supporting a section of said tire cord fabric;
   (b) adjusting said section of said fabric on said support so that said warp cords are evenly distributed in the longitudinal direction across the width of said fabric;
   (c) wetting said fabric in a supported condition on both sides with a dilute reactive polyurethane solution to provide coated cords for chemical bonding to said cast polyurethane with said spaces open and said interstices essentially preserved for mechanical bonding with said cast polyurethane of said tire;
   (d) moving said fabric into an enclosed oven while continuing to support said section of said tire fabric and heating the wetted fabric at a predetermined temperature for a predetermined time to evaporate the solvent and cause the polyurethane mixture to be at least partially cured and bond said warp cords to said pick cords; and
   (e) cooling said fabric.

2. The method in accordance with claim 1 wherein said section of said tire fabric is supported in a generally horizontal position between two spaced-apart transverse bars of a frame member and the warp cords of said fabric are adjusted to hang evenly in parallel spaced relation between said bars.

3. The method in accordance with claim 2 wherein after adjusting said warp cords so that they hang evenly between said bars said fabric is clamped at said bars and the wetting of said fabric is done by spraying said fabric in the clamped condition.

4. The method in accordance with claim 3 wherein said frame member with the wetted fabric clamped thereon is placed in an oven for heating the wetted fabric.

5. The method in accordance with claim 1 wherein said reactive polyurethane solution is prepared from a prepolymer and curative system used to cast a tire body.

6. The method in accordance with claim 5 wherein the curative is added to the prepolymer so that the ratio of amine groups of the curative to the free NCO groups of the prepolymer is in the range of from 0.8/1 to 1/1 with the free NCO groups being the excess of NCO groups of the polyisocyanate over the hydroxyl groups of the polymeric polyols in the prepolymer.

7. The method in accordance with claim 6 wherein said prepolymer is prepared separately by charging a reactor with a predetermined amount of polyol, degassing said polyol and then charging a required amount of diisocyanate to said degassed polyol at a predetermined temperature under agitation and with a full vacuum applied for a minimum period of time to mix the diisocyanate and polyol.

8. The method in accordance with claim 1 wherein said coated fabric is heated at a temperature of about 250° F. (100° C.) for a period of time in the range of from about one-half hour to three hours.

9. The method in accordance with claim 7 wherein said curative solution is made by dissolving a predetermined amount of diamine curative in liquid ketone.

* * * * *